United States Patent
Zhang et al.

(10) Patent No.: US 9,904,827 B2
(45) Date of Patent: Feb. 27, 2018

(54) INDUCTION-BASED DATA IDENTIFICATION SYSTEM CHARACTERIZED BY REAL-TIME RESPONSE

(71) Applicants: HANGZHOU CENTURY TECHNOLOGY CO., LTD., Zhejiang (CN); HANGZHOU CENTURY CO., LTD., Zhejiang (CN)

(72) Inventors: Lei Zhang, Zhejiang (CN); Hongfeng Ye, Zhejiang (CN); Aifen Zhu, Zhejiang (CN); Wei Shang, Zhejiang (CN)

(73) Assignees: HANGZHOU CENTURY TECHNOLOGY CO., LTD., Hangzhou, Zhejiang (CN); HANGZHOU CENTURY CO., LTD., Hangzhou, Zhejiang (CN)

( * ) Notice: Subject to any disclaimer, the term of this patent is extended or adjusted under 35 U.S.C. 154(b) by 0 days.

(21) Appl. No.: 15/309,967

(22) PCT Filed: Apr. 17, 2015

(86) PCT No.: PCT/CN2015/076888
§ 371 (c)(1),
(2) Date: Jul. 17, 2017

(87) PCT Pub. No.: WO2016/107016
PCT Pub. Date: Jul. 7, 2016

(65) Prior Publication Data
US 2017/0351888 A1    Dec. 7, 2017

(30) Foreign Application Priority Data

Dec. 31, 2014 (CN) .......................... 2014 1 0849456

(51) Int. Cl.
*G06K 7/10* (2006.01)
*G08B 13/22* (2006.01)
(Continued)

(52) U.S. Cl.
CPC ......... *G06K 7/10366* (2013.01); *G08B 13/22* (2013.01); *G08B 29/181* (2013.01); *G08B 13/1418* (2013.01); *G08B 25/10* (2013.01)

(58) Field of Classification Search
CPC .. G06K 7/10366; G08B 13/22; G08B 29/181; G08B 13/1418; G08B 25/10;
(Continued)

(56) References Cited

U.S. PATENT DOCUMENTS 9,318,007 B2 * 4/2016 Valiulis .................. G08B 13/14
2003/0216969 A1 * 11/2003 Bauer .................. G06K 7/0008
705/22

(Continued)

FOREIGN PATENT DOCUMENTS

CN    101393595    3/2009
CN    101625784    1/2010
(Continued)

*Primary Examiner* — An T Nguyen
(74) *Attorney, Agent, or Firm* — Muncy, Geissler, Olds & Lowe, P.C.

(57) ABSTRACT

An induction-based data identification system having real-time response, including a plurality of mobile identity terminals that can be carried, a gateway system, and a background computer. The system configuration and method process are reasonable. It has the features of recording any update status data of the objects and real-time response without being affected by large amount of information. In addition, the mobile identity terminal has a low power consumption, suitable for the occasions of long-time use, such as anti-theft systems of shopping malls, places of detention, and warehouse management.

3 Claims, 1 Drawing Sheet

(51) Int. Cl.
*G08B 29/18* (2006.01)
*G08B 25/10* (2006.01)
*G08B 13/14* (2006.01)

(58) Field of Classification Search
CPC ............ G08B 13/2462; G08B 13/2491; G08B 13/14; G06Q 10/087; A47F 5/0823; A47F 5/0861
See application file for complete search history.

(56) References Cited

U.S. PATENT DOCUMENTS

| | | | | |
|---|---|---|---|---|
| 2011/0072132 A1* | 3/2011 | Shafer | ................... | G06Q 10/087 709/224 |
| 2013/0257618 A1* | 10/2013 | Elledge | ................... | G06F 21/88 340/572.1 |
| 2014/0351098 A1* | 11/2014 | Shafer | ................... | G06Q 10/087 705/28 |
| 2016/0180676 A1* | 6/2016 | Slim | ................... | G08B 13/2491 340/541 |
| 2017/0351888 A1* | 12/2017 | Zhang | ................ | G06K 7/10366 |

FOREIGN PATENT DOCUMENTS

| | | |
|---|---|---|
| CN | 102855724 | 1/2013 |
| CN | 103729923 | 4/2014 |

\* cited by examiner

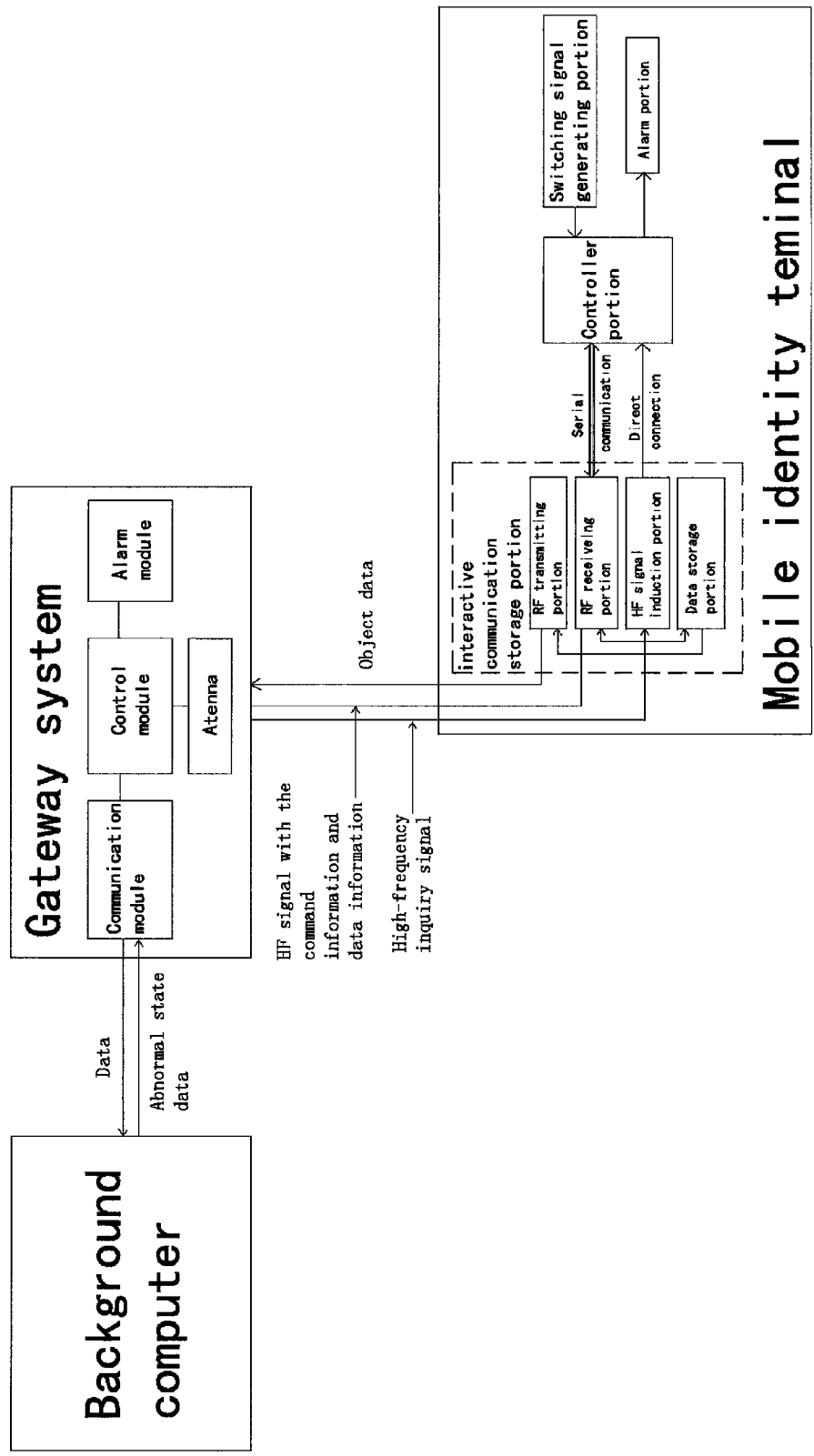

INDUCTION-BASED DATA IDENTIFICATION SYSTEM CHARACTERIZED BY REAL-TIME RESPONSE

FIELD OF THE INVENTION

The present invention relates to an induction-based data identification system.

BACKGROUND

In order to prevent from being brought out of the business premises illegally, merchandises in the shopping malls, supermarkets and other open shelves are often equipped with merchandise anti-theft device. These anti-theft devices are generally connected and carried with merchandises in different means. When merchandises are stolen and pass the antenna door of the security system, it will trigger alarms. This kind of anti-theft system has the feature of real-time response, but it can give alarms only for the theft itself, cannot give alarms accurately for the stolen merchandises and the time of theft, nor have recording function. Thus, with the increasing respect of public interest, the existing anti-theft system will easily lead to disputes over rights.

For the door access and gateway system with the data checking and data recording functions, the real-time performance is of important significance due to the existence of data communication and storage, and it is also an important factor influencing its performance and scope of applications.

SUMMARY

In order to solve the technical problems, the present invention provides an induction-based data identification system characterized by real-time response, which can real-time update data for the objects, give real-time alarm for abnormal state, to enhance the data identification level. To this end, the present invention employs the following technical solutions:

An induction-based data identification system characterized by real-time response, including:

A plurality of mobile identity terminals that can be carried, and the mobile identity terminal is equipped with a controller portion, an alarm portion, an interactive communication storage portion, wherein the interactive communication storage portion includes a RF receiving portion, a RF transmitting portion, a HF signal induction portion, and a data storage portion, the RF receiving portion is connected to the controller portion via a serial mode and the HF signal induction portion is directly connected with the controller portion via wires;

The data identification system further includes:

A background computer, which is entered with the data carrying objects of the mobile identity terminal in advance;

A gateway system, which is arranged in a fixed way and provide with an antenna for direct data communication with the RF receiving portion of the interactive communication storage portion of the mobile identity terminal, a communication module that communicates with the background computer, an alarm module and a control module, the antenna transmits HF signals with the command information and data information for receiving by the RF receiving portion of the interactive communication storage portion of the mobile identity terminal in the signal coverage area;

The gateway system transmits HF inquiry signals for inquiry via the antenna, the interactive communication storage portion of the mobile identity terminal can trigger the pre-set response process after its HF signal induction portion receives the HF inquiry signal, and the object data stored in the data storage portion are transmitted in real time manner by the RF transmitting portion, the antenna of the gateway system reads the object data and enter the data into the background computer, then the data are compared with the pre-entered object data in the background computer to judge if the object is in a normal state according to the matching condition;

If the object is determined in an abnormal state, the background computer records the current status data of the object to the background database, and sends abnormal status flag data to the gateway system, and the control module of the gateway system makes its alarm module to give alarms and transmit abnormal status flag data via the antenna, after the RF receiving portion of the interactive communication storage portion of the mobile identity terminal receives the abnormal status flag data, the abnormal status flag data will be directly stored in the data storage portion of the interactive communication storage portion of the mobile identity terminal according to the pre-set response process;

The controller portion of the mobile identity terminal is in a sleep state under the normal state, when the mobile identity terminal enters the antenna signal coverage area of the gateway system, the HF signal induction portion of the interactive communication storage portion of the mobile identity terminal receives high-frequency inquiry signals transmitted from the antenna, the induction signals of the high-frequency inquiry signals are triggered by the HF signal induction portion of the controller portion of the mobile identity terminal, and awaken from the sleep state, to read the data storage portion of the interactive communication storage portion, when the abnormal status flag data are read, the alarm portion of the mobile identity terminal gives alarm and the alarm time information is recorded in the data storage portion of the interactive communication storage portion.

On the basis of above technical solutions, the present invention further employs the following technical solutions:

When awaken, the controller portion of the mobile identity terminal can read the data storage portion of the interactive communication storage portion, and if no abnormal status flag data are read, it is considered to have a normal data checking operation at this time, and the normal data checking operation information is recorded in the data storage portion of the interactive communication storage portion.

The mobile identity terminal is also provided with a switching signal generating portion, and the switching signal generating portion is connected with the controller portion; the switching signal generating portion is equipped with cables, and switching signals are generated by cable breakages, and the cables are used to connect the mobile identity terminal to the object;

When cables break, the switching signal generating portion generates switching signals to awake the controller portion of the mobile identity terminal, the controller controls the alarm portion to give alarm and record the time of cable breakage in the data storage portion of the interactive communication storage portion.

With the technical solutions, the system configuration and method process of the invention are reasonable; it has both the features of recording any update status data of the objects and real-time response without affected by large amount of information; in addition, the mobile identity terminal has a low power consumption, suitable for the occasions of long-time use, such as anti-theft systems of shopping malls, places of detention, warehouse management, etc.

BRIEF DESCRIPTION OF THE DRAWINGS

The sole FIGURE shows a schematic diagram of the system provided in the invention.

DETAILED DESCRIPTION

In this embodiment, a data identification system provided in the invention is used as a security system of a shopping mall.

Referring to the sole FIGURE, an induction-based data identification system characterized by real-time response, including:

A plurality of mobile identity terminals that can be carried, and the mobile identity terminals are connected to their respective merchandizes one by one.

the mobile identity terminal is equipped with a controller portion, an alai in portion, an interactive communication storage portion, wherein the interactive communication storage portion includes a RF receiving portion, a RF transmitting portion, a HF signal induction portion, and a data storage portion, the RF receiving portion is connected to the controller portion via a serial mode and the HF signal induction portion is directly connected with the controller portion via wires;

The controller portion can control the alarm portion to give status indication of an EAS system, to indicate that the EAS system is in a protection state or an alarm state. An interactive communication storage portion constitutes a communication circuit, when the mobile identity terminal enters the electromagnetic field covered by a gateway system or a reader, it will have a radio frequency communication with the gateway system or reader.

The data identification system further includes:

A background computer, which is entered with the data carrying objects of the mobile identity terminal in advance (i.e. the merchandizes connected to the mobile identity terminal);

When the data identification system in the invention is used as an anti-theft system, the gateway system is fixed at the exits as an access control, and provide with an antenna for direct data communication with the RF receiving portion of the interactive communication storage portion of the mobile identity terminal, a communication module that communicates with the background computer, an alarm module and a control module, the antenna transmits HF signals with the command information and data information for receiving by the RF receiving portion of the interactive communication storage portion of the mobile identity terminal in the signal coverage area;

The gateway system is always working and transmitting HF inquiry signals for inquiry via the antenna with the signal frequency of 860M-960M. When the merchandises with the mobile identity terminal enter the antenna electromagnetic field coverage, the interactive communication storage portion of the mobile identity terminal can trigger the pre-set response process after its HF signal induction portion receives the HF inquiry signal, and the object data stored in the data storage portion are transmitted in real time manner by the RF transmitting portion, the antenna of the gateway system reads the object data and enter the data into the background computer, then the data are compared with the pre-entered object data in the background computer to judge if the object is in a normal state according to the matching condition;

If the object is determined in an abnormal state (for example, when an merchandise is illegally brought out and there is no payment record in the background computer, but the information of mobile identity terminal connected with the merchandise sent from the gateway system is received, it can be determined abnormal state such as theft), the background computer records the current status data of the object to the background database, and sends abnormal status flag data to the gateway system, and the control module of the gateway system makes its alarm module to give alarms and transmit abnormal status flag data via the antenna, after the RF receiving portion of the interactive communication storage portion of the mobile identity terminal receives the abnormal status flag data, the abnormal status flag data will be directly stored in the data storage portion of the interactive communication storage portion of the mobile identity terminal according to the pre-set response process. The whole process has been started before the controller portion is involved, which can save power consumption, reduce the amount of data processing, to achieve real-time quick response.

The controller portion of the mobile identity terminal is in a sleep state under the normal state, when the mobile identity terminal enters the antenna signal coverage area of the gateway system, the HF signal induction portion of the interactive communication storage portion of the mobile identity terminal receives high-frequency inquiry signals transmitted from the antenna, the induction signals of the high-frequency inquiry signals are triggered by the HF signal induction portion of the controller portion of the mobile identity terminal, and awaken from the sleep state, to read the data storage portion of the interactive communication storage portion, when the abnormal status flag data are read, the alarm portion of the mobile identity terminal gives alarm and the alarm time information is recorded in the data storage portion of the interactive communication storage portion.

When awaken, the controller portion of the mobile identity terminal can read the data storage portion of the interactive communication storage portion, and if no abnormal status flag data are read, it is considered to have a normal data checking operation at this time, such as inventory operation behavior, settlement behavior of sales of goods, the interactive communication storage portion receives control commands issued from the controller portion, to record the normal data checking operation information in the data storage portion of the interactive communication storage portion.

When a data identification system in the invention is used as a merchandise anti-theft system in a shopping mall, the mobile identity terminal is employed as a merchandise anti-theft device. At this time, the mobile identity terminal is also provided with a switching signal generating portion, and an output terminal of the switching signal generating portion is connected to a signal input terminal of the controller portion; the switching signal generating portion is equipped with cables, and switching signals are generated by cable breakages, and the cables are used to connect the mobile identity terminal to the object, namely, the merchandise anti-theft device is tied to the rope of the item to be protected;

When cables break (i.e. when cables are cut by a thief), the switching signal generating portion generates switching signals to awake the controller portion of the mobile identity terminal, the controller controls the alarm portion to give alarm and record the time of cable breakage in the data storage portion of the interactive communication storage portion.

The switching signal generating portion can also be used in response to pressing and pop of a protection switch and output the response signals to the controller portion. The response signals awake the controller portion of the mobile identity terminal, and the controller portion stores the data such as alarm time data, inventory time data to the data storage portion of the interactive communication storage portion.

The specific embodiments described above are used to explain rather than limit the invention. Any modification, equivalent replacement and improvement made within the spirit and claims of the invention shall fall within the scope of protection of the present invention.

The invention claimed is:

1. An induction-based data identification system characterized by real-time response, comprising:
   a plurality of mobile identity terminals that can be carried, and the mobile identity terminal is equipped with a controller portion, an alarm portion, an interactive communication storage portion, wherein the interactive communication storage portion comprises a RF receiving portion, a RF transmitting portion, a HF signal induction portion, and a data storage portion, the RF receiving portion is connected to the controller portion via a serial mode and the HF signal induction portion is directly connected with the controller portion via wires;
   the data identification system further comprises:
   a background computer, which is entered with the data carrying objects of the mobile identity terminal in advance;
   a gateway system, which is arranged in a fixed way and provide with an antenna for direct data communication with the RF receiving portion of the interactive communication storage portion of the mobile identity terminal, a communication module that communicates with the background computer, an alarm module and a control module, the antenna transmits HF signals with the command information and data information for receiving by the RF receiving portion of the interactive communication storage portion of the mobile identity terminal in the signal coverage area;
   the gateway system transmits HF inquiry signals for inquiry via the antenna, the interactive communication storage portion of the mobile identity terminal can trigger the pre-set response process after its HF signal induction portion receives the HF inquiry signal, and the object data stored in the data storage portion are transmitted in real time manner by the RF transmitting portion, the antenna of the gateway system reads the object data and enter the data into the background computer, then the data are compared with the pre-entered object data in the background computer to judge if the object is in a normal state according to the matching condition;
   if the object is determined in an abnormal state, the background computer records the current status data of the object to the background database, and sends abnormal status flag data to the gateway system, and the control module of the gateway system makes its alarm module to give alarms and transmit abnormal status flag data via the antenna, after the RF receiving portion of the interactive communication storage portion of the mobile identity terminal receives the abnormal status flag data, the abnormal status flag data will be directly stored in the data storage portion of the interactive communication storage portion of the mobile identity terminal according to the pre-set response process;
   the controller portion of the mobile identity terminal is in a sleep state under the normal state, when the mobile identity terminal enters the antenna signal coverage area of the gateway system, the HF signal induction portion of the interactive communication storage portion of the mobile identity terminal receives high-frequency inquiry signals transmitted from the antenna, the induction signals of the high-frequency inquiry signals are triggered by the HF signal induction portion of the controller portion of the mobile identity terminal, and awaken from the sleep state, to read the data storage portion of the interactive communication storage portion, when the abnormal status flag data are read, the alarm portion of the mobile identity terminal gives alarm and the alarm time information is recorded in the data storage portion of the interactive communication storage portion.

2. The induction-based data identification system characterized by real-time response according to claim 1, wherein the controller portion of the mobile identity terminal can read the data storage portion of the interactive communication storage portion when awaken, and if no abnormal status flag data are read, it is considered to have a normal data checking operation at this time, and the normal data checking operation information is recorded in the data storage portion of the interactive communication storage portion.

3. The induction-based data identification system characterized by real-time response according to claim 1, wherein the mobile identity terminal is also provided with a switching signal generating portion, and the switching signal generating portion is connected with the controller portion; the switching signal generating portion is equipped with cables, and switching signals are generated by cable breakages, and the cables are used to connect the mobile identity terminal to the object;
   when cables break, the switching signal generating portion generates switching signals to awake the controller portion of the mobile identity terminal, the controller controls the alarm portion to give alarm and record the time of cable breakage in the data storage portion of the interactive communication storage portion.

* * * * *